US010240709B2

(12) United States Patent
Burbridge et al.

(10) Patent No.: US 10,240,709 B2
(45) Date of Patent: Mar. 26, 2019

(54) SYSTEM AND METHOD FOR PROTECTING ONE OR MORE PIPES AGAINST CORROSION AND CORROSION-PROTECTED PIPE

(71) Applicant: Corrpro Companies, Inc., Medina, OH (US)

(72) Inventors: Matthew Burbridge, Calgary (CA); Levi Blumhagen, Alberta (CA); Shawn Poworoznik, Calgary (CA)

(73) Assignee: Corrpro Companies, Inc., Medina, OH (US)

( * ) Notice: Subject to any disclaimer, the term of this patent is extended or adjusted under 35 U.S.C. 154(b) by 0 days.

(21) Appl. No.: 15/620,500

(22) Filed: Jun. 12, 2017

(65) Prior Publication Data
US 2017/0356587 A1 Dec. 14, 2017

Related U.S. Application Data

(60) Provisional application No. 62/348,881, filed on Jun. 11, 2016.

(51) Int. Cl.
*F16L 1/036* (2006.01)
*F16L 58/10* (2006.01)
(Continued)

(52) U.S. Cl.
CPC ............ *F16L 58/1081* (2013.01); *E21B 7/20* (2013.01); *E21B 17/003* (2013.01); *F16L 1/028* (2013.01);
(Continued)

(58) Field of Classification Search
CPC . F16L 1/028; F16L 1/032; F16L 1/036; F16L 58/02; F16L 58/10; F16L 58/1054
(Continued)

(56) References Cited

U.S. PATENT DOCUMENTS 3,179,168 A  4/1965 Vincent
3,724,224 A  4/1973 Matthews, Jr.
(Continued)

FOREIGN PATENT DOCUMENTS

CN   103527848   *  1/2014
WO  WO2005047402 A1  5/2005

OTHER PUBLICATIONS

Brugg/Pipesystems Flexible Solutions, Flexwell District Heating Cable, Jan. 28, 2016, FHK 5.0, 35 pgs.
(Continued)

*Primary Examiner* — Frederick L Lagman
(74) *Attorney, Agent, or Firm* — Stinson Leonard Street LLP

(57) ABSTRACT

A carrier pipe is protected from corrosion by being received inside a casing at a location above ground. The casing, which can be formed from a polymer, defines a gap extending around an exterior surface of the carrier pipe. In one embodiment, the gap is substantially filled with a potting material having a corrosion-resistant property. In another embodiment, a self-contained impressed current cathodic protection system is received in the gap. A pull head is installed on the carrier pipe and/or casing for pulling the pipe assembly, including carrier pipe, casing, and elements received in the gap, into an underground bore as a single unit. In some embodiments multiple pipe assemblies are pulled together into the same bore.

25 Claims, 5 Drawing Sheets

(51) Int. Cl.
    *F16L 1/028* (2006.01)
    *F16L 9/02* (2006.01)
    *F16L 9/19* (2006.01)
    *E21B 7/20* (2006.01)
    *E21B 17/00* (2006.01)

(52) U.S. Cl.
    CPC ............... *F16L 1/036* (2013.01); *F16L 9/02* (2013.01); *F16L 9/20* (2013.01); *F16L 58/1036* (2013.01)

(58) Field of Classification Search
    USPC ..................................... 405/157, 178, 184.5
    See application file for complete search history.

(56) References Cited

U.S. PATENT DOCUMENTS

| | | | | |
|---|---|---|---|---|
| 3,774,403 | A * | 11/1973 | Cushing | F16L 7/00 138/105 |
| 3,989,281 | A * | 11/1976 | Wilde, Jr. | F16L 13/0272 285/45 |
| 4,110,991 | A * | 9/1978 | Torkuhl | F16L 1/16 156/294 |
| 4,318,639 | A * | 3/1982 | Schosek | F16L 1/028 285/242 |
| 4,453,603 | A * | 6/1984 | Voss | E21B 7/20 175/53 |
| 4,469,469 | A * | 9/1984 | Kennedy, Jr. | F16L 58/12 138/DIG. 6 |
| 4,507,019 | A * | 3/1985 | Thompson | E21B 7/046 138/97 |
| 4,700,751 | A | 10/1987 | Fedrick | |
| 4,925,616 | A * | 5/1990 | Brown | F16L 58/00 106/219 |
| 4,932,810 | A * | 6/1990 | Austin | F16L 58/00 405/154.1 |
| 4,956,032 | A * | 9/1990 | Hahn | E03F 3/06 138/97 |
| 4,993,875 | A * | 2/1991 | Nicholson, Sr. | F16L 58/00 285/294.4 |
| 5,165,822 | A * | 11/1992 | Hein | E21B 17/08 405/154.1 |
| 5,427,475 | A * | 6/1995 | Coss | E21B 7/205 175/53 |
| 5,651,639 | A * | 7/1997 | Wentworth | F16L 55/1657 405/184 |
| 5,871,034 | A * | 2/1999 | Sumner | F16L 59/14 138/137 |
| 6,109,832 | A * | 8/2000 | Lincoln | F16L 55/1658 175/53 |
| 6,142,707 | A * | 11/2000 | Bass | E21B 17/015 137/341 |
| 6,224,957 | B1 | 5/2001 | Crook et al. | |
| 6,524,031 | B2 * | 2/2003 | Carter | B23D 21/02 175/53 |
| 6,565,285 | B1 * | 5/2003 | Landrichter | B29B 7/50 405/155 |
| 6,739,803 | B2 * | 5/2004 | Bass | F16L 1/16 138/115 |
| 6,926,040 | B1 | 8/2005 | Prescott et al. | |
| 6,953,305 | B2 * | 10/2005 | John | E21B 7/20 175/53 |
| 7,753,412 | B2 * | 7/2010 | Royston | F16L 47/005 137/312 |
| 8,651,149 | B2 * | 2/2014 | Katona | F16L 1/11 138/106 |
| 9,285,065 | B2 * | 3/2016 | Williams | F16L 9/04 |
| 9,303,807 | B1 * | 4/2016 | Lyons | F16L 55/115 |
| 9,719,611 | B1 * | 8/2017 | Ziola | F16L 1/032 |
| 2004/0086339 | A1 * | 5/2004 | Tyrer | E21B 17/012 405/156 |
| 2006/0118192 | A1 | 6/2006 | Cook | |
| 2008/0173367 | A1 * | 7/2008 | Keyes | F16L 59/15 138/149 |
| 2009/0050225 | A1 * | 2/2009 | Thomas | F16L 7/00 138/104 |
| 2009/0301596 | A1 | 12/2009 | van Oosten | |
| 2013/0067732 | A1 | 3/2013 | Kadaster | |
| 2014/0124082 | A1 * | 5/2014 | Williams | F16L 9/04 138/172 |

OTHER PUBLICATIONS

Thermacor, Ferro-Term Erm Specification Guide, FPGS 7.109, dated Mar. 24, 2015, 2 pgs.
International Search Report from related application PCT/US2017/037068 dated Aug. 17, 2017, 5 pgs.
Written Opinion from related application PCT/US2017/037068 dated Aug. 17, 2017, 8 pgs.

* cited by examiner

SYSTEM AND METHOD FOR PROTECTING ONE OR MORE PIPES AGAINST CORROSION AND CORROSION-PROTECTED PIPE

CROSS-REFERENCE TO RELATED APPLICATION

This application claims priority to U.S. Provisional Patent Application Ser. No. 62/348,881, entitled CATHODIC PROTECTION SHIELDING MITIGATION IN PIPELINES and filed Jun. 11, 2016, which is hereby incorporated by reference in its entirety.

FIELD

This disclosure generally relates to a system and method for protecting one or more pipes against corrosion and a corrosion-protected pipe for being received inside a bore.

BACKGROUND

Pipelines include one or more carrier pipes that carry fluids such as oil and natural gas from a source point to an end point. Pipelines can be very long and occasionally must extend through bores in the ground to avoid obstacles such as infrastructure improvements, buildings, bodies of water, etc. One technique for forming bores is horizontal directional drilling. Forming suitable bores can be expensive. To limit drilling costs, multiple carrier pipes in a pipeline can be installed together as a group in the same bore. A more expensive alternative is to drill separate bores for each carrier pipe. An advantage of drilling separate bores for each carrier pipe is that conventional cathodic protection systems can be used without adverse cathodic shielding that typically occurs when cathodically protected pipes are bundled together in a single bore.

SUMMARY

In one aspect, a corrosion-protected pipe assembly for being pulled into a bore comprises a carrier pipe having a first transition portion, a second transition portion, a length extending between the first transition portion and the second transition portion, and a wall extending along the length having an exterior surface and an interior surface defining a carrier lumen. A casing receives the carrier pipe and has a first end portion adjacent the first transition portion of the carrier pipe, a second end portion adjacent the second transition portion of the carrier pipe, a length extending between the first end portion and the second end portion of the casing, and a wall extending along the length of the casing having an exterior surface and an interior surface extending around the exterior surface of the carrier pipe wall along the length of the casing to define a gap between the interior surface of the casing and the exterior surface of the carrier pipe along at least a segment of the length of the casing. Potting material substantially fills said gap. A pull head mounted on the corrosion-protected pipe assembly is configured to transmit a pulling force to the corrosion-protected pipe assembly for pulling the pipe assembly into the bore as a unit.

In another aspect, method of installing an underground carrier pipe comprises positioning a casing over the carrier pipe while the carrier pipe is above ground such that a gap is defined between an interior surface of the casing and an exterior surface of the carrier pipe. The gap is substantially filled with a potting material while the carrier pipe is above ground to form a corrosion-protected pipe assembly. The corrosion-protected pipe assembly is pulled into a bore.

In yet another aspect, corrosion-protected pipe assembly received in a bore comprises a metal carrier pipe having a first transition portion, a second transition portion, a length extending between the first transition portion and the second transition portion, and a wall extending along the length having an exterior surface and an interior surface defining a lumen. A polymer casing has a first end portion adjacent the first transition portion of the carrier pipe, a second end portion adjacent the second transition portion of the carrier pipe, a length extending between the first end portion and the second end portion of the casing, and a wall extending along the length of the casing having an exterior surface and an interior surface extending around the exterior surface of the carrier pipe wall along the length of the casing to define a gap between the interior surface of the casing and the exterior surface of the carrier pipe along at least a segment of the length of the casing. Potting material substantially fills said gap and has at least one corrosion-resistant property selected from the group of corrosion-resistant properties consisting of moisture transmission inhibitor and volatile corrosion inhibitor.

In still another aspect, a kit for protecting a carrier pipe configured to be installed in a bore against corrosion comprises a casing having an interior surface defining a lumen and configured for receiving the carrier pipe in the interior lumen to define a gap between the interior surface and the carrier pipe received in the interior lumen. Potting material is configured to substantially fill said gap. A pull head is configured to be connected to the casing and to transmit a pulling force to the casing for pulling the casing, the carrier pipe, and the potting material received in said gap simultaneously into the bore as a unit.

In another aspect, a corrosion-protected pipe assembly comprises a carrier pipe having a length and a wall extending along the length having an exterior surface and an interior surface defining a lumen. An inner spacer extends outward from the exterior surface of the carrier pipe to an outer end along at least a portion of the length of the carrier pipe and defines an inner spacer thickness between the exterior surface of the carrier pipe and the outer end of the inner spacer. The inner spacer defines at least one inner spacer passage extending along the inner spacer thickness from the exterior surface of the carrier pipe through the outer end of the inner spacer. A sacrificial anode is disposed over the inner spacer in fluid communication with the at least one inner spacer passage. A conductive coupling material substantially fills the at least one inner spacer passage and electrically couples the carrier pipe to the sacrificial anode. An electrically insulating casing extends around the sacrificial anode, the inner spacer, and the carrier pipe along at least a portion of the length of the carrier pipe. The carrier pipe and the sacrificial anode are configured to be electrically coupled to a power supply which conveys electrons from the sacrificial anode to the carrier pipe to protect the carrier pipe against corrosion.

In yet another aspect, a method of providing corrosion protection of a carrier pipe comprises disposing a sacrificial anode over the carrier pipe such that the sacrificial anode is spaced apart from an exterior surface of the carrier pipe in fluid communication with the exterior surface of the carrier pipe. A casing is positioned over the carrier pipe and the sacrificial anode such that the sacrificial anode is received in a gap between an interior surface of the casing and the exterior surface of the carrier pipe. At least a portion of the gap is filled with a conductive coupling material to electrically couple the carrier pipe to the sacrificial anode using the coupling material.

In still another aspect, a kit for protecting a carrier pipe having an exterior surface and configured to be installed in a bore against corrosion comprises a casing having an interior surface defining a lumen and configured for receiving the carrier pipe in the lumen to define a gap between the interior surface and the carrier pipe received in the lumen. An inner spacer is configured to be disposed on the carrier pipe inside said gap and has an outer end spaced apart from the exterior surface of the carrier pipe when disposed on the carrier pipe. The inner spacer is configured to define at least one inner spacer passage extending from the exterior surface of the carrier pipe through the outer end of the inner spacer when the inner spacer is disposed on the carrier pipe. A sacrificial anode is configured to be disposed on the inner spacer inside the gap in fluid communication with the at least one inner spacer passage. A conductive coupling material is configured to substantially fill the at least one inner spacer passage to electrically couple the carrier pipe to the sacrificial anode.

Other aspects will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
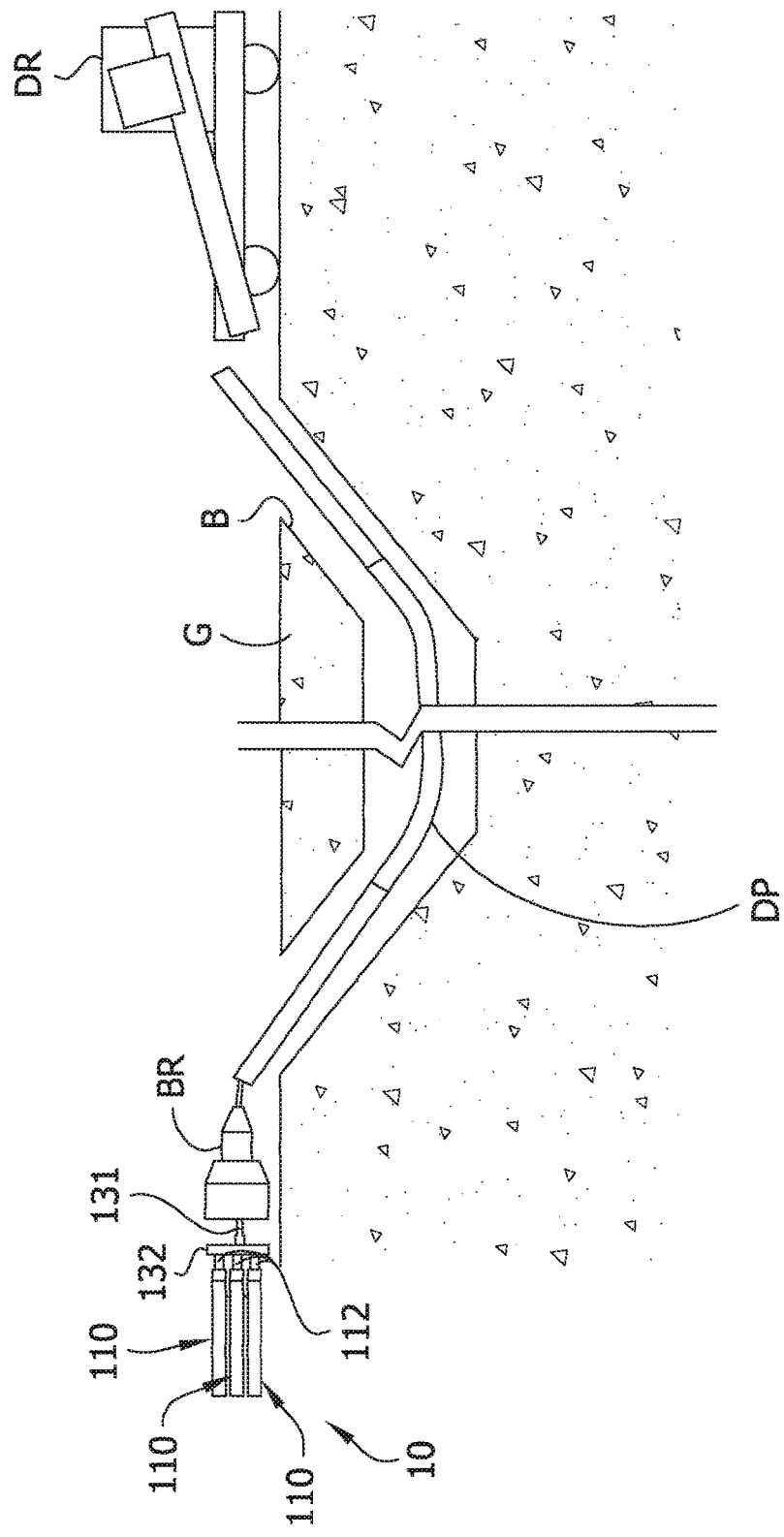
FIG. 1 is a schematic illustration of an underground pipeline bore and a system for pulling a bundle of corrosion-protected pipe assemblies into the bore.

Referring to FIG. 1, a bundle of pipe assemblies for use in forming a segment of a pipeline that extends through a bore B in the ground G is generally indicated at reference number 10. In the illustrated embodiment, the bundle 10 comprises a plurality of corrosion-protected pipe assemblies, generally indicated at 110, which are described in greater detail below. In other embodiments, the bundle can include one or more pipes or pipe assemblies of other types. In the bundle 10, the pipe assemblies 110 are positioned adjacent one another and connected to a drill rig DR by a chain of drill pipes DP and a drilling tool such as the illustrated back reamer BR. As explained below, the pipe assemblies 110 are configured to be pulled together into the same bore B and to form a segment of a pipeline that extends through the bore and is protected from corrosion inside the bore.

Figure 2:
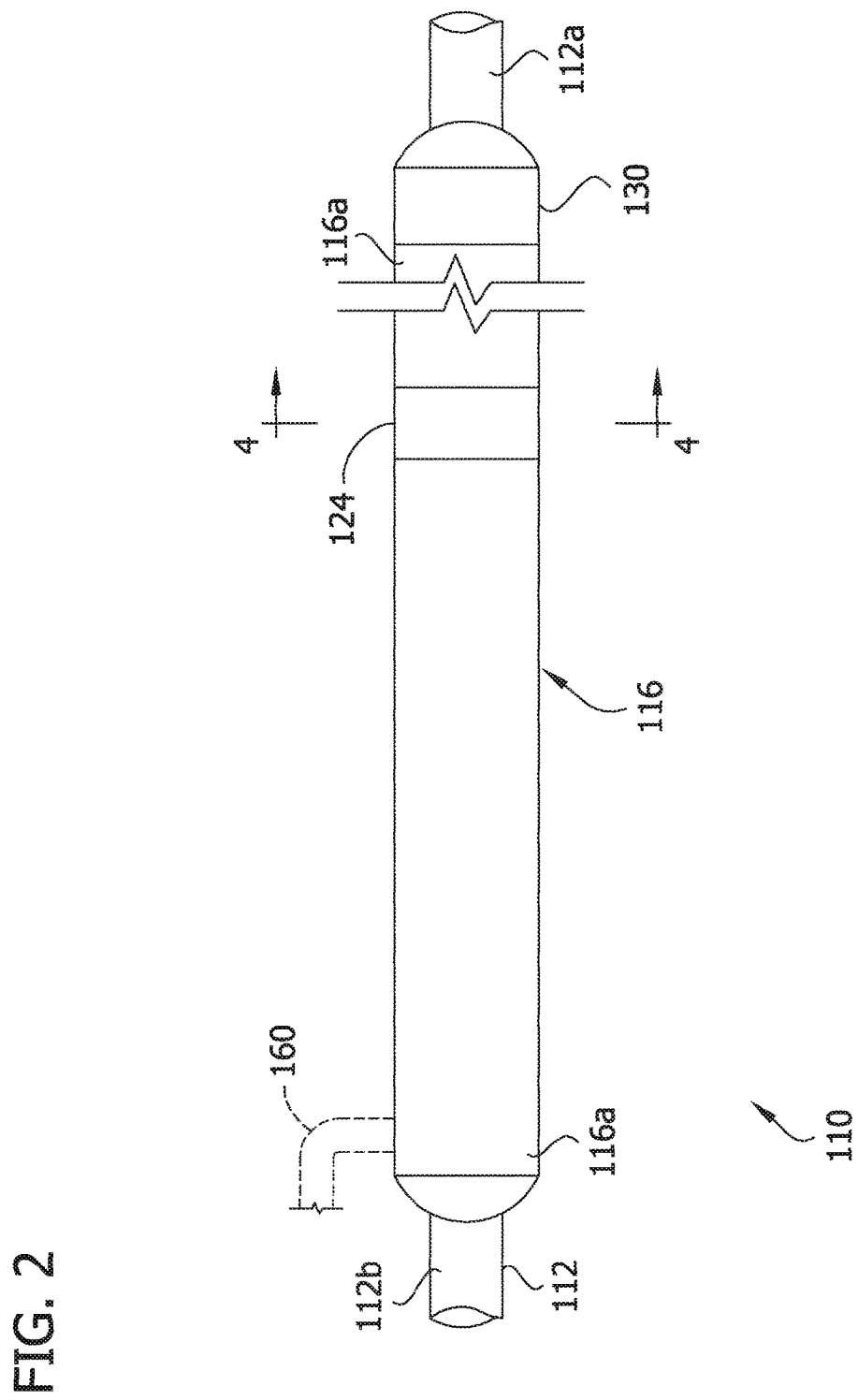
FIG. 2 is a fragmentary elevation of a corrosion-protected pipe assembly.
Figure 3:
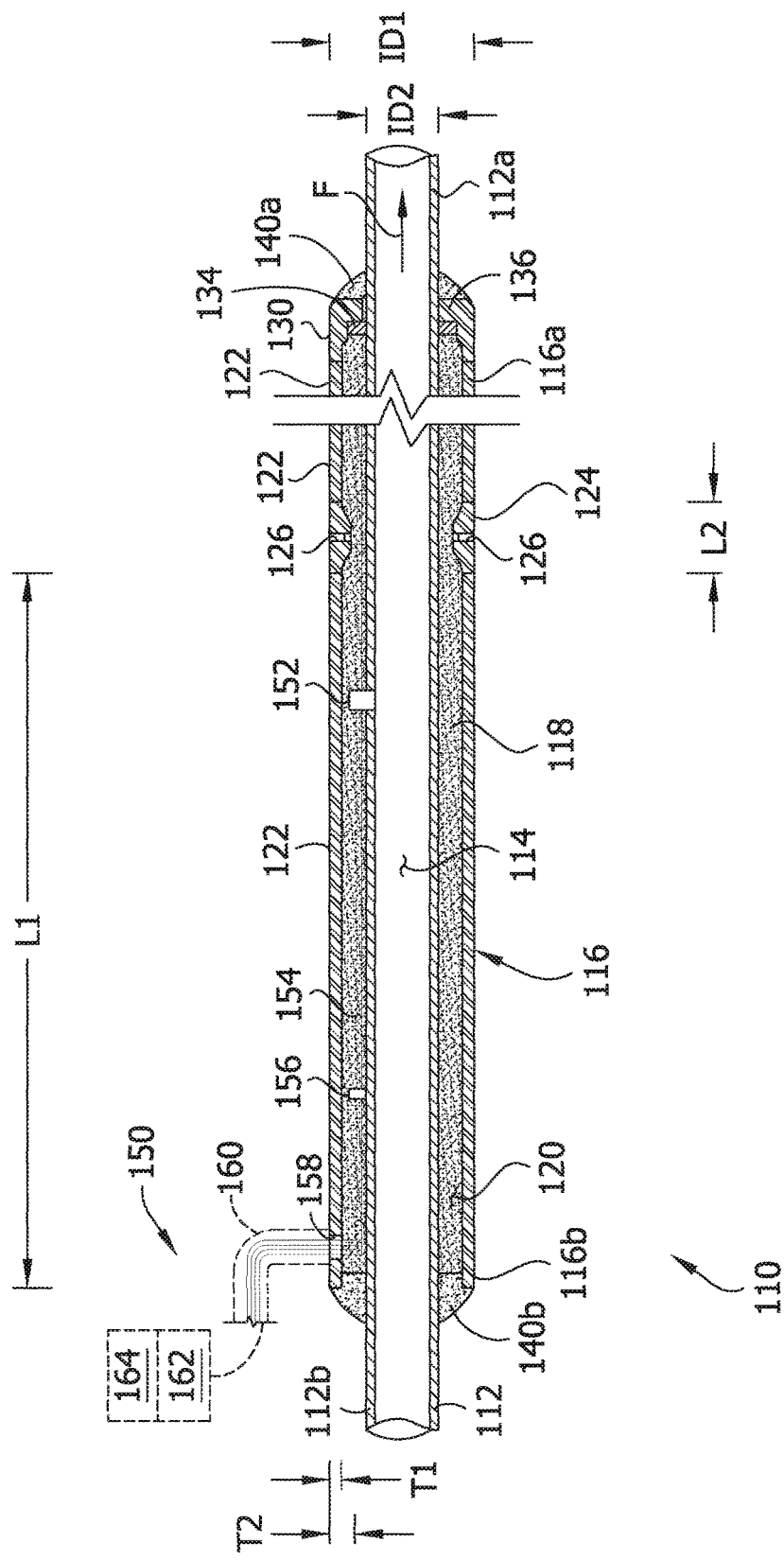
FIG. 3 is a longitudinal section of the corrosion-protected pipe assembly.
Figure 4:
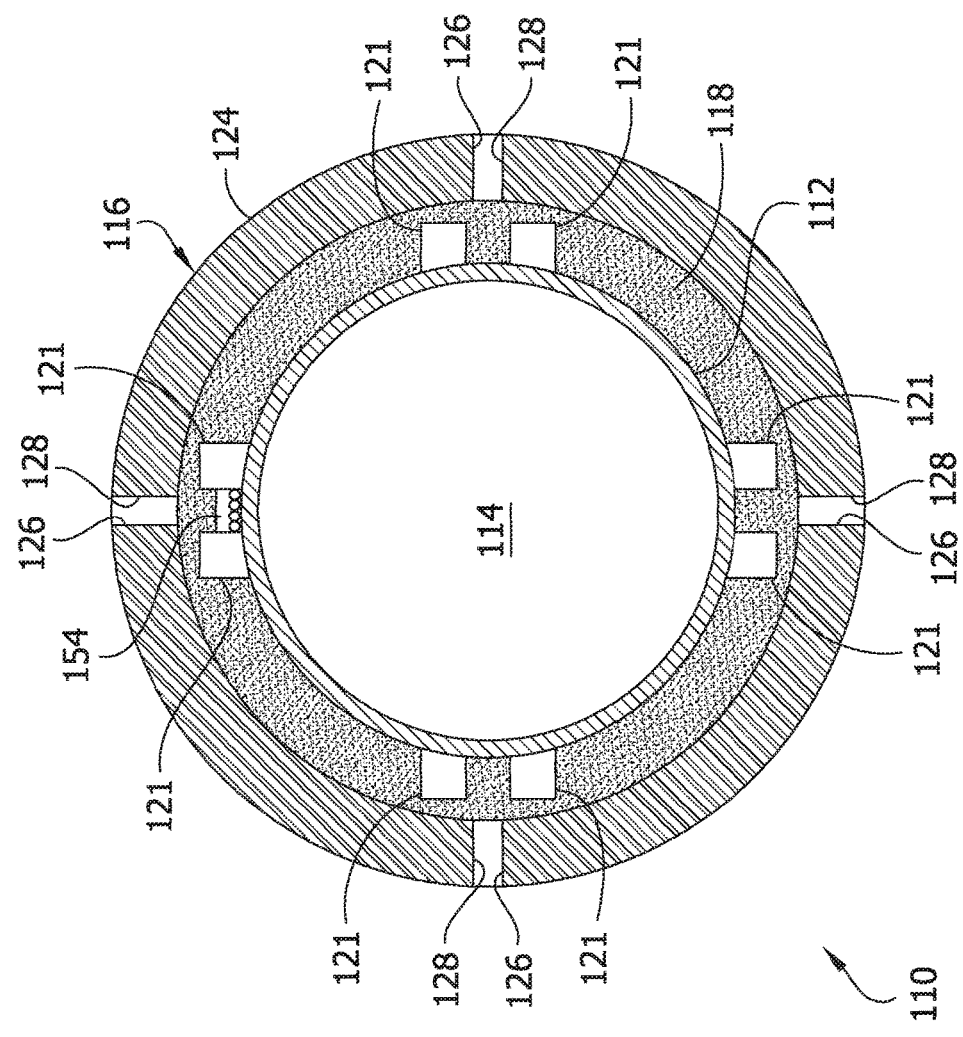
FIG. 4 is a section taken in the plane of line 4-4 of FIG. 2.

Referring to FIGS. 2-4, an exemplary corrosion-protected pipe assembly 110, which can be used in the bundle 10 or as the sole conduit in a section of a pipeline, will now be described in greater detail. Other than components of the pipe assembly 110 illustrated in dashed lines, the pipe assembly is shown in FIGS. 2-4 in a configuration prior to being pulled into the bore B. In other words, the pipe assembly 110 is generally shown in FIGS. 2-4 in a configuration that exists when the pipe assembly is outside of the bore B and ready for being installed into the bore. The components of the pipe assembly 110 shown in dashed lines can, in some embodiments, be installed on the pipe assembly after the pipe assembly is pulled into the bore B.

The pipe assembly 110 includes an inner carrier pipe 112 having a first transition portion 112a, a second transition portion 112b, and a length extending between the first transition portion and the second transition portion. The carrier pipe 112 comprises a metal (e.g., steel) wall that extends along the length and has an exterior surface and an interior surface that defines a carrier lumen 114. As is known in the art, without protection the wall of the carrier pipe 112 is subject to corrosion, which can damage or create leaks in the installed pipeline. To protect the carrier pipe 112 against corrosion, the pipe assembly 110 includes a casing, generally indicated at 116, which receives the carrier pipe. The casing is formed from a non-corroding material such as a polymer (e.g., a polyethylene (PE) such as high density PE (HDPE)). As explained below, before the pipe assembly 110 is pulled into the bore B, the casing 116 is configured to receive a corrosion-resistant potting material 118 in a gap 120 defined between the casing and the carrier pipe. In the illustrated embodiment, the pipe assembly 110 is free of a cathodic protection system and the corrosion protection features of the pipe assembly function without of cathodic protection. In other embodiments, the pipe assembly 110 could include a cathodic protection system in addition to one or more of the corrosion protection features discussed in greater detail below.

In general, the casing 116 has a first end portion 116a adjacent the first transition portion 112a of the carrier pipe 112, a second end portion 116b adjacent the second transition portion 112b of the carrier pipe, and a length extending between the first end portion and the second end portion of the casing. The casing 116 has an interior surface extending around the exterior surface of the wall of the carrier pipe 112 along the length of the casing. The interior surface of the wall of the casing 116 and the exterior surface of the wall of the carrier pipe 112 define the gap 120 along at least as segment of the length of the casing. In one or more embodiments, the pipe assembly 110 is configured so the gap is generally annular in shape. Referring to FIG. 4, in the illustrated embodiment, a plurality of spacer rails 121 are positioned in the gap 120 between the carrier pipe 112 and the casing 116 and maintain the annular shape of the gap. As explained below, the gap 120 has a radial dimension that is larger than the radial extent of the spacer rails 121 along segments of the casing 116 having a relatively large internal diameter ID1 so that the spacer rails fit within other segments of the casing (described more fully hereinafter) having smaller internal diameters ID2 (FIG. 3). The illustrated rails 121 are formed in a suitable manner, such as by joining the rails to the carrier pipe 112 so that they extend along its length at circumferentially spaced apart positions. For example, the rails 121 can be formed of PE and joined to the carrier pipe using an epoxy in certain embodiments.

In one or more embodiments, the casing 116 is formed from multiple polymer components that are fused together to form the casing. In the illustrated embodiment, the casing 116 comprises a plurality of HDPE casing tubes 122 arranged along the length of the casing. Each casing tube 122 has a first end portion, a second end portion, and a length L1 extending between the first end portion and the second end portion. In one or more embodiments the length L1 of at least one of the casing tubes 122 is in one embodiment at least about 15 m. The casing tubes 122 are arranged in end-to-end fashion so that the first end portion of one casing tube is located adjacent the second end portion of another casing tube. A casing coupler 124 is located between each casing tube 122 in an adjacent pair. Each casing coupler 124 has a first end portion joined to the second end portion of an adjacent casing tube 122 and a second end portion joined to the first end portion of another adjacent casing tube. In certain exemplary embodiments, the casing couplers 124 are formed from a PE such as HDPE and joined to the PE casing tubes 122 by butt fusion. After fusing together the casing tubes 122 and the casing couplers 124, the bead formed on the exterior surface of the casing is removed to ensure the pipe assembly 110 has a smooth exterior profile. The illustrated casing coupler 124 has a length L2 extending between the first and second end portions that is substantially shorter than the length L1 of the casing tubes 122.

Injection ports 126 extend radially through a middle portion of each coupler 124. As explained below, the potting material 118 is injected in flowable form into the gap 120 through one or more of the injection ports 126. In the illustrated embodiment, each coupler 124 defines four circumferentially spaced apart injection ports 126 that are sealed with a plug 128. In one or more embodiments, the plug 128 comprises an externally threaded stopper configured to be threadably received in an injection port 126 to seal the injection port. Plugs can have other configurations in other embodiments. The thickness of the coupler 124 increases and the internal diameter of the coupler decreases as the coupler extends inward from the end portions toward the middle portion to strengthen the coupler at the injection ports 128. At the end portions, the coupler 124 has an internal diameter ID1 that is about the same as the internal diameter of the casing tubes 122 and a thickness T1 that is about the same as the thickness of the carrier tubes. Along a middle portion, the coupler 124 has an internal diameter 1D2 that is smaller than the internal diameter ID1 and a thickness T2 that is larger than the thickness T1. The coupler 124 defines the smaller internal diameter segments of the casing 116 in the middle portion of the coupler. In one or more embodiments, the thickness T2 is in one embodiment at least about 5 mm larger than the thickness T1.

Referring to FIG. 3, the pull head 130 is mounted on the pipe assembly 110 for transmitting a pulling force F (e.g., applied by the drilling rig DR) to the pipe assembly for pulling the pipe assembly into the bore B as a unit. That is, the pull head 130 is used to connect the casing 116 and the carrier pipe 112 for being pulled into the bore B by the same pulling force F. More specifically, the illustrated pull head 130 is configured to transmit the pulling force from the carrier pipe 112 to the casing 116. As shown in FIG. 1, the back reamer BR is connected by a swivel 131 to a group pull head 132. The group pull head 132 is attached (e.g., welded) to each carrier pipe 112 in the group 10. Thus, the drilling rig DR, drill pipe DP, and back reamer BR impart a pulling force F first on the carrier pipe 112. The pull head 130 connects the casing 116 to the carrier pipe 112 so that the carrier pipe and the casing are pulled into the bore B conjointly as a single unit.

In the illustrated embodiment, the pull head 130 cooperates with a flange 134 joined to the carrier pipe 112 (e.g., a metal flange welded to the carrier pipe) adjacent the first transition portion 112a to connect the casing 116 to the carrier pipe. The flange 134 extends radially outward from the exterior surface of the carrier pipe wall and has an end surface facing generally in the direction of the pulling force F. The pull head 130 has a first end portion defining a lip 136 facing in a direction opposite the pulling force F and opposing the end surface of the flange 136. A second end portion of the pull head 130 is joined to the first end portion 116a of the casing 116. In one embodiment, the pull head 130 is formed from a polymer (e.g., a PE such as HDPE) and the second end portion is butt fused to the first end portion 116a of the casing. The fused joint between the pull head 130 and the casing 116 is strong enough to transmit the pulling force F to the casing. As with the fused joints discussed above, the external portions of the bead formed during fusion of the pull head joint are removed to maintain a smooth exterior surface along the pipe assembly 110. Other embodiments can use other pull head configurations without departing from the scope of the invention.

At each end portion 116a, 116b of the casing 116, a plug 140a, 140b seals the gap 120 to prevent the potting material 118 from escaping through the end portions of the gap. At the first end portion 116a, the plug 140a is positioned adjacent the end of the pull head 130 in the illustrated embodiment. In other embodiments, the pull head 130 could be configured to seal the first end portion of the gap 120 during pull-in and the plug 140a could be connected directly to the end portion 116a of the casing 116 after removing the pull head 130 when pull-in is complete. In the illustrated embodiment, the plug 140a includes rock-hardened putty (broadly, a curable material) built up around the carrier pipe 112 at the free end of the pull head 130. A portion of the rock-hardened putty extends into an annular space between the lip 136 of the pull head 130 and the carrier pipe 112. High strength fiber mat is layered over the putty and coated with a wax that forms a rigid shell of the plug 140a. Similarly, the plug 140b includes rock-hardened putty built up around the carrier pipe 112 at the end portion 116b of the casing 116. A portion of the rock-hardened putty extends into an annular space between the casing end portion 116b and the carrier pipe 112. High strength fiber mat is layered over the putty and coated with a wax that forms a rigid shell of the plug 140b.

A corrosion detection system, generally indicated at 150, is operatively connected to the carrier pipe 112 for detecting corrosion of the carrier pipe. The corrosion protection system 150 includes a plurality of resistance coupons 152 (e.g., canary style coupons) that are made from material that corrodes at least as quickly as the carrier pipe 112. The coupons 152 (only one is shown in the drawings) are coupled to the exterior surface of the carrier pipe 112 (e.g., using an epoxy) at spaced apart locations along the length of the carrier pipe (e.g., about every 200 m along the length of the carrier pipe). Wires 154 connected to the coupons 152 extend along the length of the carrier pipe 112 inside the gap 120 and between the spacers 121. The wires 154 are secured to the exterior surface of the carrier pipe 112 by a fastener such as filament tape 156. The wires 154 extend out of the gap through a wiring port 158 formed in the end portion 116b of the casing 116. The wiring port 158 is sealed with a plug of, for example, plumbers putty. In some embodiments the wires 154 can extend out of the gap 120 through an injection port 126 formed in the coupler 124. After the pipe assembly 110 is pulled into the bore B, a conduit 160 is attached to the end portion 116b of the casing 116 that protects the wires as they extend to a location above the ground G where they are connected to a junction box 162. In the illustrated embodiment, the conduit 160 includes a rigid 90° bend at the casing 116 and a flexible tube (not shown) extending from the 90° bend to surface of the ground G. The junction box 162 connects the wires 154, and thus the coupons 152, to a resistance measurement device 164, which detects the resistance of the coupons and compares it to a threshold resistance determined at the time of installation. Resistance changes in response to corrosion of the coupons 152 and thus corrosion of the coupons, (which is indicative of corrosive conditions within the potted gap 120) can be detected when the measurement device 164 detects a change in resistance.

In one or more embodiments, the potting material 118 comprises one of a wax and a gel. Suitably, the potting material 118 is configured to be flowable, at least while being injected into the gap 120. The potting material 118 has at least one corrosion-resistant property. For example, certain potting materials 118 are moisture transmission inhibitors that resist corrosion by limiting the transmission of moisture through the potting material to the carrier pipe 112. Additionally, the potting material 118 could be a volatile corrosion inhibitor (VCI) that resists corrosion by reacting with corrosive materials such as oxygen and chlorine to neutralize the materials before they can corrode the carrier pipe.

In one embodiment, the potting material 118 is a moisture transmission inhibitor such as Innercoat® hot-applied wax sold by Trenton Corporation of Ann Arbor, Mich. The wax can be dielectric to inhibit the flow of electric current through the material, which could otherwise hasten corrosion. In addition, in some embodiments, the wax can be hydrophobic to repel moisture that would enter the gap 120 through the casing 116 away from the gap before it can corrode the carrier pipe 112. In certain embodiments, the wax is injected at a relatively high temperature and hardens as it cools. Thus, when installed, potting materials of this type 118 hold their shape and provide a relatively permanent moisture barrier. Moreover, the dimensional stability of hardened waxes allows the potting material 118 to permanently cover and seal breaches in the casing 116 that may be formed as the pipe assembly 110 is pulled into the bore. Installed properly, it is believed that potting material 118 formed by a moisture transmission inhibiting wax can have a life of more than 40 years.

In another embodiment, the potting material 118 is a VCI gel. At field conditions at the site of a bore B, VCI gel is a flowable material. The VCI gel can be injected into the gap 120 through the injection ports 126 without heating the gel on site. The VCI components of the gel become spent as they react with corrosive materials in the installed pipe assembly 110. Thus, to provide long-term corrosion protection, the VCI gel can be maintained by periodically replacing the expended VCI gel with new VCI gel. Because the gel is flowable at field conditions, spent gel can be pumped from and new gel can be simultaneously pumped into the gap 120 while the pipe assembly 110 is installed in the bore.

Although described above in an assembled configuration ready for being pulled into a bore B, various components of the corrosion-protected pipe assembly 110 can, prior to assembly, form a kit for forming the corrosion-protected pipe assembly. Thus any one or more of at least the potting material 118, the spacers 121, the casing tubes 122, the casing couplers 124, the pull head 130, the flange 134, the plugs 140a, 140b, the coupons 152, the wires 154, the fasteners 156 the conduit 160, the junction box 162, and the resistance measurement device 164 can be grouped together in a kit for providing corrosion protection to the carrier pipe 112. Likewise, these components may be grouped with the carrier pipe in a kit for assembling a corrosion-protected pipe assembly 110.

An exemplary method of using the corrosion-protected pipe assembly 110 including a process for assembling the corrosion-protected pipe assembly from such a kit will now be briefly described. In the illustrated embodiment, before receiving the carrier pipe 112 inside the casing 116, a technician can secure the spacer rails 121 on the exterior surface of the carrier pipe 112. For example, the technician sand blasts the exterior surface of the carrier pipe 112 and hand sands the rails 121 and adheres the rails onto the exterior surface using an epoxy. In addition, the technician can connect the corrosion detection coupons 152 to the exterior surface of the carrier pipe 112 and secure the wires to extend along the length of the pipe using the filament tape 156.

With the fixed components that will ultimately be received inside the gap 120 secured in place, the technician positions the casing 116 over the carrier pipe 112 while the carrier pipe is above ground to define the gap 120. Specifically, the technician arranges casing tubes 122 and casing couplers 123 in end-to-end fashion over the carrier pipe 112 in alternating sequence along the length of the carrier pipe. The technician butt fuses each end of a casing coupler 124 to an adjacent end of a casing tube 122 to form the casing 116. If not preinstalled, the technician welds the flange 134 onto the transition portion 112a of the carrier pipe 112. After butt fusing the casing tubes 122 and couplers 124 together, the technician removes the external bead at each fusion joint. The technician also fuses the pull head 130 onto the end portion 116a of the casing in alignment with the carrier pipe so that the lip 136 opposingly engages the flange 134. After fusing the pull head 130, the user removes the external bead at the fusion joint. In some embodiments, the technician drills the injection ports 126 through the couplers 126 and the wire port 158 through the end portion 116b of the casing 116 on site. In other embodiments, one or more of the ports is pre-drilled in the coupler 124 prior to assembly of the casing 116.

After positioning the casing 116 over the carrier pipe 112 and installing the pull head 130, the technician installs the plugs 140a, 140b. The technician places uncured putty on the end of the pull head 130 and the end portion 116b of the casing 116, applies the high strength fiber wrap over the putty, coats the material with wax, and allows the plug to cure (e.g., overnight). The wax hardens to form a rigid shell of the respective plug 140a, 140b. With the plugs 140a, 140b, sealing the ends of the gap 120, the technician injects the potting material 118 into the gap through selected injection ports. In certain embodiments, the potting material is simultaneously or sequentially injected at multiple injection ports 126 spaced apart along the length of the casing 116. If the potting material is a wax, the technician heats the wax to a less viscous and thus more flowable state at the work site adjacent the bore B before injecting. The technician injects the potting material 118 into the gap 120 at the work site until it substantially fills the gap.

In some embodiments, the technician binds the corrosion-protected pipe assembly 110 together with other corrosion protected pipe assemblies or other kinds of pipes to form the bundle 10 shown in FIG. 1. For example, the user can use zip-ties, straps, or other binding structure to bind the pipes together in the bundle 10. It is understood that in other embodiments, the corrosion-protected pipe assembly 110 can be used as a single pipe to be pulled into the bore B. The group pull head 132 is fitted onto the transition portion 112a of at least one carrier pipe 112 and secured by the back reamer BR and the swivel 131 to the drill pipe DP extending through the bore B, from a first access point adjacent the bundle 10 to a second access point adjacent the drilling rig DR.

In one embodiment, the technician drills the bore B by horizontal directional drilling HDD after assembling the pipe assembly 110. In other embodiments, the bore B can be drilled before or simultaneously with the assembly of the pipe assembly 110. In the illustrated embodiment, the drilling rig DR is positioned at an access point to the bore B remote from the bundle 10 and pulls the bundle into the bore in a pullback operation using the back reamer BR. In other embodiments, the drilling rig could be configured to pull the bundle 10 into the bore B in a one-pass drilling operation, in which case the drilling rig and the bundle would be positioned adjacent the same access point during pull in. The technician connects the drill pipe DP to the back reamer BR, connects the back reamer to the swivel, 132, and connects the swivel to the bundle pull head 132. As the drilling rig DR back-reams the bore B, it simultaneously pulls the bundle or group 10 into the bore.

The group pull head 132 transmits the pulling force F to each carrier pipe 112 and flange 134 in the group 10. The flange 134 transmits the pulling force F to the lip 136 of the respective pull head 130, and the pull head transmits the pulling force to the respective casing 116. Thus, the drilling rig DR pulls the pipe assembly 110—including carrier pipe 112 and casing 116—into the bore B as a single unit. If the pipe assembly 110 is one of a plurality of pipes in a bundle 10, the drilling rig DR pulls the entire bundle conjointly into the bore B, applying the pulling force to each carrier pipe 112 using the same bundle pull head 132. Each pipe assembly 110 is at least somewhat bendable along its length so that the pipe assembly or bundle of pipe assemblies can navigate bends in the path of the bore during pull in. After being pulled into position, the technician installs the conduit 160 and runs the wires 154 to the junction box 162, thereby connecting the coupons 152 to the resistance measurement device. In one embodiment, the technician removes the pull head 130 after pulling and installs a new plug 140*a* of the end portion 116*a* of the casing 116.

When the pipeline is in operation, the potting material 118 and casing 116 protect the carrier pipe 112 from corrosion without using cathodic protection. If a moisture transmission inhibitor wax is used for the potting material 118, the potting material protects the carrier pipe 112 from corrosion by limiting the transmission of moisture through the potting material to the carrier pipe. If a VCI gel is used for the potting material 118, the potting material protects the carrier pipe 112 from corrosion by reacting with corrosive materials such as oxygen and chlorine to destroy the corrosive materials in the gap 120 before they can reach the carrier pipe. During use, the corrosion detection system 150 continuously monitors for corrosion of the coupons 152 by measuring the resistance of the coupons. If corrosion is detected by a change in resistance that exceeds a threshold, the resistance measurement device can provide an alarm indication that notifies a pipeline user. Occasionally, when VCI gel is used as the potting material, a technician pumps spent gel out of the gap 120 through a port (e.g., one of the injection ports 126) in the casing 116 and injects new replacement gel into the gap through the port.

Figure 5:
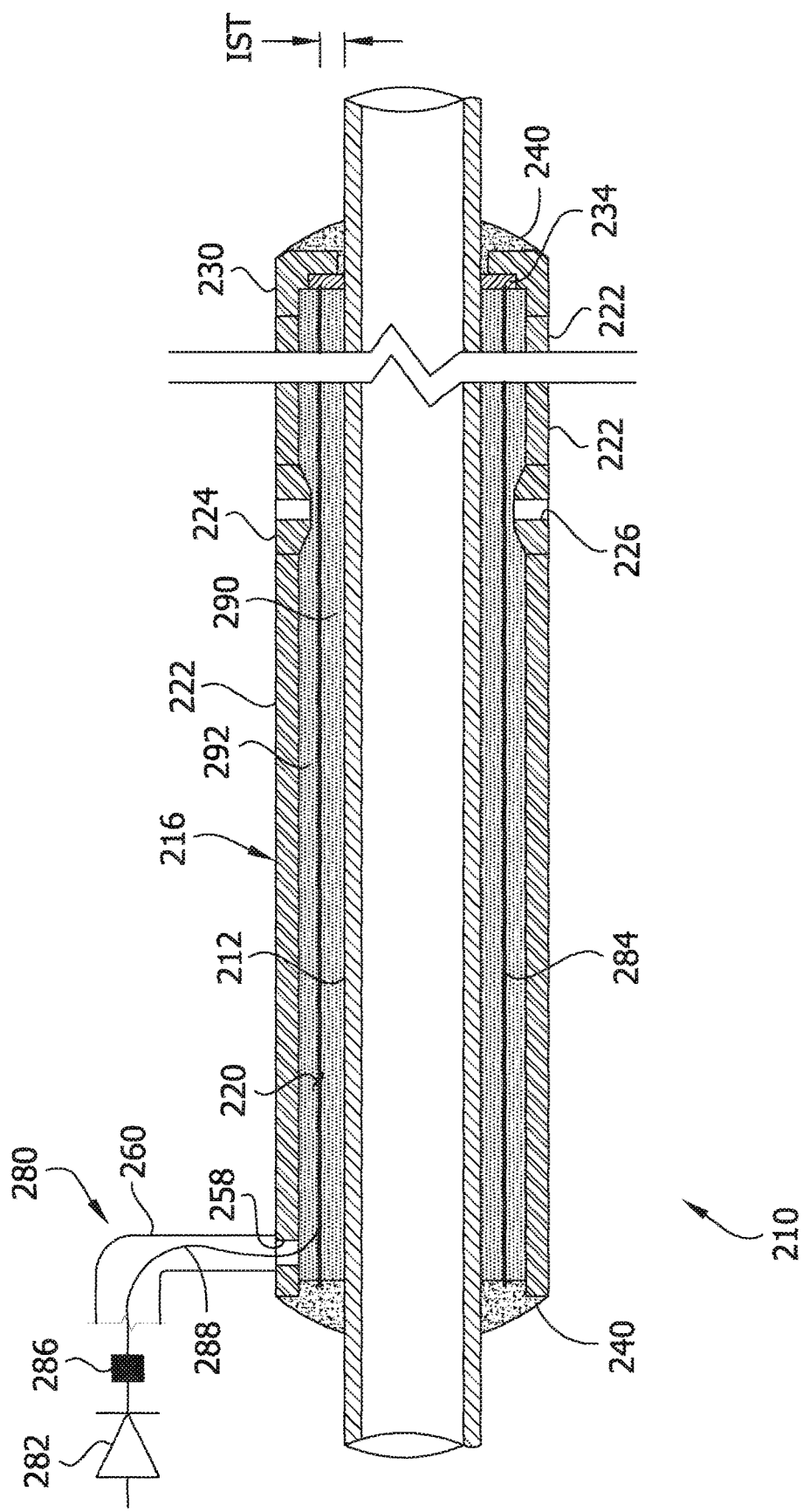
FIG. 5 is a longitudinal section of another corrosion protected pipe assembly.

Referring to FIG. 5, in certain embodiments, a bundle of pipes for being pulled into the bore B can include a corrosion-protected pipe assembly, generally indicated at 210, which comprises a self-contained cathodic protection system 280 configured to minimize cathodic shielding within the bore as described below. It is understood that the pipe assembly 210 could be used in a single-pipe pipeline as well as a bundled-pipe pipeline. The pipe assembly 210 is similar in many respects to the pipe assembly 110 and corresponding features are given corresponding reference numbers, plus 100. Like the pipe assembly 110, the pipe assembly 210 includes a metal carrier pipe 212 and an insulating casing 216 arranged relative to the carrier pipe to define a gap 220. In certain embodiments, the casing 216 is formed from butt-fused casing tubes 222 and couplers 224 (which define injection ports 226 as described above). In addition, like the pipe assembly 110, the pipe assembly 210 includes a pull head 230 fused to the casing 216 and a flange 234 that connects the pull head to the carrier pipe 212 so that the carrier pipe and casing are pulled together into the bore B as a single unit as described above. The ends of the gap 220 are sealed with plugs 240 that can have the same general construction as the plugs 140*a*, 140*b* that seal the ends of the gap 120. In one or more embodiments, the pipe assembly 220 includes a corrosion detection system akin to the corrosion detection system 150 of the pipe assembly 110, but it is not shown in FIG. 5 to illustrate other features of the pipe assembly more clearly.

Instead of using potting material to provide corrosion protection like the pipe assembly 110, the pipe assembly 210 includes the self-contained cathodic protection system, generally indicated at 280. In the illustrated embodiment, the cathodic protection system 280 is an impressed current cathodic protection system comprising a rectifier 282 (broadly, a power supply device) configured to be connected to an AC power source (not shown) and to be electrically coupled to the carrier pipe 212 (at a negative terminal of the rectifier) and a sacrificial anode 284 (at a positive terminal of the rectifier). In the illustrated embodiment, the carrier pipe 212 and the sacrificial anode 284 are connected to the rectifier 282 through a junction box 286 and wires 288 that extend from above ground at the junction box into the gap 220 through a conduit 260 and wiring port 258 formed in the casing 216. For clarity, only one rectifier 282, junction box 286, and wire conduit 260 is shown in FIG. 5. However, in an exemplary embodiment, a rectifier 282 adjacent each transition portion of the corrosion-protected pipe assembly 210 is connected to an AC power source and coupled to the anode 284 and the carrier pipe 212 through a junction box 286 connected to wires 288 extending through a conduit 260 and wiring port 258 at the respective transition portion of the pipe assembly 210. As explained below, the cathodic protection system 280 is configured to minimize cathodic shielding by positioning the sacrificial anode 284 inside the gap 220 between the carrier pipe 212 and the casing 216 in spaced apart relationship with the carrier pipe. Suitably, the sacrificial anode 284 can comprise a porous flexible sheet material (e.g., metal mesh such as titanium mesh composed of a metal oxide catalyst sintered to an expanded titanium mesh substrate).

An inner spacer 290 is configured to hold the sacrificial anode 284 in spaced apart relationship with the carrier pipe 212. The inner spacer 290 extends outward from the exterior surface of the carrier pipe 212 to an outer end along at least a portion of the length of the carrier pipe. In the illustrated embodiment, the inner spacer 290 extends circumferentially around the carrier pipe 212 along substantially the entire length of the carrier pipe and the sacrificial anode 284 is wrapped around the inner spacer. The inner spacer 290 has an inner spacer thickness IST extending between the exterior surface of the carrier pipe 212 and the outer end of the spacer. In general, the spacer 290 can define one or more inner spacer passages extending along the inner spacer thickness IST from the exterior surface of the carrier pipe 212 through the outer end of the inner spacer to provide fluid communication between the carrier pipe and the sacrificial anode 284. In the illustrated embodiment, the inner spacer 290 comprises porous material disposed around the exterior surface of the carrier pipe. The porous material defines a network of interconnected pores that define a plurality of passages communicating between the carrier pipe 212 and the sacrificial anode 284. In one embodiment, the spacer is formed from porous, dielectric, flexible sheet material (e.g., Rockshield pipe coating shield, sold by Corrpro Companies, Inc., of Houston Tex.) wrapped around the carrier pipe 212 and strapped in place. Suitably, the porous flexible sheet material of the sacrificial anode 284 is wrapped around the inner spacer 290 (broadly, disposed on the inner spacer) in fluid communication with the passages defined by the pores.

The sacrificial anode 284 can be taped, strapped, or otherwise fastened in place by a structure that forms an outer spacer 292 extending between the anode and the casing 216. In one embodiment, the outer spacer 292 comprises porous material of the same type as the inner spacer 290 wrapped around the sacrificial anode 284 and extending radially between the sacrificial anode and the casing 216. In other embodiments, other types of outer spacers can be used. For example, in one or more embodiments, tape such as Polyken® tape, sold by SEALFORLIFE Industries of Stadskanaal, the Netherlands, is wrapped around the sacrificial anode 284 at spaced apart locations along its length. For example, in an exemplary embodiment, spacer tape is wrapped around the sacrificial anode at positions that are longitudinally aligned with the girth welds of the carrier pipe 212 to reinforce the anode at these locations (which may be stressed more than other locations during pull in). The outer spacer 292 holds the sacrificial anode 284 in spaced apart relationship with the casing 216, and the pores in the material provide fluid communication between the sacrificial anode and the casing. In other embodiments, still other types of outer spacers could be used or the outer spacer could be omitted without departing from the scope of the invention.

A conductive coupling material substantially fills the void space inside the gap 220 to electrically couple the carrier pipe 212 to the sacrificial anode 284. For example, the conductive coupling material can be a flowable fluid injected through one or more injection portions 226 formed in the casing 216 to fill the pores in the inner spacer 290, the outer spacer 292, and the mesh anode 284. Exemplary conductive fluids can include conductive gels (e.g., an electrolyte) having little or no corrosive material contents such as chlorine. Because the pores of the inner spacer 290 fluidly communicate between the carrier pipe 212 and the sacrificial anode 284, the conductive fluid filling the pores provide a pathway for current to flow from the anode to the exterior surface of the carrier pipe. Thus, the rectifier 282 draws or impresses a current through the coupling fluid to convey electrons from the sacrificial anode 290 to the carrier pipe 212 and thereby cathodically protect the carrier pipe 212 against corrosion.

Although described above in an assembled configuration, various components of the corrosion-protected pipe assembly 210 can, prior to assembly, form a kit for forming the corrosion-protected pipe assembly. Thus any one or more of at least the inner spacer 290, the sacrificial anode 284, the outer spacer 292, the wires 288, the junction box 286, the rectifier 282, the casing tubes 222, the casing couplers 224, the pull head 230, the flange 234, the plugs 240, and the conduit 260 can be grouped together in a kit for providing corrosion protection to the carrier pipe 212. Likewise, these components may be grouped with the carrier pipe in a kit for assembling a corrosion-protected pipe assembly 210.

In one embodiment, a plurality of corrosion protected pipe assemblies 210 are installed together in a bundle in the bore B. To assemble each pipe assembly 210, the porous sheet material is wrapped around the carrier pipe 212 and strapped in place to form the inner spacer 290. If desired, before securing the inner spacer 290 to the carrier pipe 212, the technician can install a corrosion monitoring system (not shown) such as the corrosion monitoring system 150 discussed above. After installing the inner spacer 290, the technician wraps the mesh anode 284 around the inner spacer and secures the anode in place. For example, in one embodiment, the technician wraps metal mesh around the inner spacer 290 in lengths of about 100 m. In one embodiment, the technician secures the sacrificial anode 284 in place with tape. The technician connects the wires 288 to the sacrificial anode 284 and the carrier pipe 212 and secures the outer spacer 292 around the anode. After installing the spacers 290, 292 and the sacrificial anode 284 the technician installs the casing 216 as described above in reference to the casing 116 and runs the wires 258 through the wiring ports 288 at each end portion of the casing. The technician also installs the pull head 230 and the end seals 240 in the same manner as the pull head 130 and the end seals 140a, 140b described above. With the casing 216 installed and sealed by the end seals 240, the technician injects the conductive fluid through the injection ports 226 in the casing 216 to substantially fill the void space in the gap 220.

After pipe assemblies 210 are assembled, the technician can strap them together to form a bundle. Using pull yokes on the carrier pipes 212 as described above, the technician pulls the bundle into the bore B using the drilling rig DR. As above, the pull heads 230 connect the casings 216 to the carrier pipes 212 so that each pipe assembly 210 is pulled into the bore B as a unit. After being pulled into position, the technician connects the conduits 260 to each casing 216 in communication with the wiring ports 258 and runs the wires 288 through the conduits to the junction boxes 286 positioned above ground. The technician connects the junction boxes 286 to the rectifiers 282 and connects the rectifiers to an AC current source. The rectifiers transmit DC current through the junction box 286 and the wires 288 to impress a current through the conductive coupling fluid between the sacrificial anode 284 and the carrier pipe 212. The current conveys electrons from the sacrificial anode 284 to the carrier pipe 212 through the coupling fluid in the gap 220 to inhibit the carrier pipe from corroding. Moreover, because the cathodic protection system 280 of each pipe assembly 210 draws a current between the carrier pipe 212 and the anode 284 through a space inside the gap 220 unique to the particular carrier pipe and not a common soil environment with multiple carrier pipes, each cathodic protection system is self-contained and the effects of cathodic shielding are otherwise minimized.

Other Statements of the Invention

A. A kit for protecting a carrier pipe configured to be installed in a bore against corrosion, the kit comprising:
a casing having an interior surface defining a lumen and configured for receiving the carrier pipe in the interior lumen to define a gap between the interior surface and the carrier pipe received in the interior lumen;
potting material configured to substantially fill said gap; and
a pull head configured to be connected to the casing and to transmit a pulling force to the casing for pulling the casing, the carrier pipe, and the potting material received in said gap simultaneously into the bore as a unit.

B. A kit as set forth in statement A wherein the casing comprises a polymer material.

C. A kit as set forth in statement A wherein the pull head is configured to be connected to the carrier pipe for transmitting the pulling force from the carrier pipe to the casing.

D. A kit as set forth in statement A wherein the potting material has at least one corrosion-resistant property selected from the group of corrosion-resistant properties consisting of moisture transmission inhibitor and volatile corrosion inhibitor.

E. A kit as set forth in statement A wherein the potting material comprises a flowable material.

F. A kit as set forth in statement A wherein the potting material comprises one of a wax and a gel.

G. A kit as set forth in statement A wherein the casing comprises a plurality of casing tubes, each having a first end portion and a second end portion, and at least one casing coupler having a first end portion configured to be connected to the second end portion of one of the plurality of casing tubes and a second end portion configured to be connected to the first end portion of another of the plurality of casing tubes.

H. A kit as set forth in statement G wherein the casing coupler comprises a port for injecting the potting material into the gap.

I. A kit as set forth in statement A further comprising a curable material configured for being positioned over an end portion of said gap and curing to form a plug that seals the end portion of said gap.

J. A kit as set forth in statement A further comprising at least one spacer configured to be positioned in the gap between the casing and the carrier pipe.

K. A kit as set forth in claim J further comprising a sacrificial anode configured to be supported on the spacer inside the gap spaced apart relationship with the carrier pipe.

L. A corrosion-protected pipe assembly, the pipe assembly comprising:
a carrier pipe having a length and a wall extending along the length having an exterior surface and an interior surface defining a lumen;
an inner spacer extending outward from the exterior surface of the carrier pipe to an outer end along at least a portion of the length of the carrier pipe and defining an inner spacer thickness between the exterior surface of the carrier pipe and the outer end of the inner spacer, the inner spacer defining at least one inner spacer passage extending along the inner spacer thickness from the exterior surface of the carrier pipe through the outer end of the inner spacer;
a sacrificial anode disposed over the inner spacer in fluid communication with the at least one inner spacer passage;
a conductive coupling material substantially filling the at least one inner spacer passage and electrically coupling the carrier pipe to the sacrificial anode; and
an electrically insulating casing extending around the sacrificial anode, the inner spacer, and the carrier pipe along at least a portion of the length of the carrier pipe; and
wherein the carrier pipe and the sacrificial anode are configured to be electrically coupled to a power supply which conveys electrons from the sacrificial anode to the carrier pipe to protect the carrier pipe against corrosion.

M. A pipe assembly as set forth in statement L wherein the inner spacer comprises porous material disposed around the exterior surface of the carrier pipe.

N. A pipe assembly as set forth in statement M wherein the porous material defines pores, the inner spacer passage being defined by one or more of the pores.

O. A pipe assembly as set forth in statement L wherein the sacrificial anode comprises one or more sheets of metal mesh wrapped around the inner spacer.

P. A pipe assembly as set forth in statement L further comprising an outer spacer disposed between the sacrificial anode and the casing.

Q. A cathodic protection system comprising a pipe assembly as set forth in statement L and a power supply device electrically coupled to the carrier pipe and the sacrificial anode thereof.

R. A bundle of corrosion-protected pipes including a plurality of pipe assemblies as set forth in statement L received in a bore.

S. A method of providing corrosion protection of a carrier pipe, the method comprising:
disposing a sacrificial anode over the carrier pipe such that the sacrificial anode is spaced apart from an exterior surface of the carrier pipe in fluid communication with the exterior surface of the carrier pipe;
positioning a casing over the carrier pipe and the sacrificial anode such that the sacrificial anode is received in a gap between an interior surface of the casing and the exterior surface of the carrier pipe; and
filling at least a portion of the gap with a conductive coupling material to electrically couple the carrier pipe to the sacrificial anode using the coupling material.

T. A method as set forth in statement S further comprising positioning an inner spacer between the sacrificial anode and the exterior surface of the carrier pipe so that the inner spacer defines passaging for providing fluid communication between the sacrificial anode and the carrier pipe through a thickness of the inner spacer.

U. A method as set forth in statement T wherein the step of positioning the inner spacer comprises disposing porous material around the exterior surface of the carrier pipe.

V. A method as set forth in statement T wherein the step of disposing the sacrificial anode over the carrier pipe comprises wrapping metal mesh around the inner spacer.

W. A method as set forth in statement S further comprising positioning an outer spacer between the sacrificial anode and the casing.

X. A method as set forth in statement S further comprising connecting the carrier pipe and the sacrificial anode to a common power supply.

Y. A method as set forth in statement X further comprising actuating the power supply to convey electrons from the sacrificial anode through the conductive coupling material to the carrier pipe.

Z. A method as set forth in statement S wherein the step of positioning the casing is performed after the step of disposing the sacrificial anode.

AA. A method as set forth in statement S further comprising pulling the carrier pipe, the sacrificial anode, and the conductive coupling material into a bore after the steps of disposing the sacrificial anode, positioning the casing, and filling at least the portion of the gap.

AB. A method as set forth in statement AA wherein the step of pulling further comprises simultaneously pulling at least one additional pipe into the bore inn a bundle with the carrier pipe, the sacrificial anode, and the conducive coupling material.

AC. A method as set forth in statement AA further comprising drilling the bore by horizontal directional drilling.

AD. A kit for protecting a carrier pipe having an exterior surface and configured to be installed in a bore against corrosion, the kit comprising:
a casing having an interior surface defining a lumen and configured for receiving the carrier pipe in the lumen to define a gap between the interior surface and the carrier pipe received in the lumen;
an inner spacer configured to be disposed on the carrier pipe inside said gap and having an outer end spaced apart from the exterior surface of the carrier pipe when disposed on the carrier pipe, the inner spacer configured to define at least one inner spacer passage extending from the exterior surface of the carrier pipe through the outer end of the inner spacer when the inner spacer is disposed on the carrier pipe;
a sacrificial anode configured to be disposed on the inner spacer inside the gap in fluid communication with the at least one inner spacer passage; and
a conductive coupling material configured to substantially fill the at least one inner spacer passage to electrically couple the carrier pipe to the sacrificial anode.

AE. A kit as set forth in statement AD wherein the inner spacer comprises a porous flexible sheet configured to be wrapped around the exterior surface of the carrier pipe.

AF. A kit as set forth in statement AE wherein the porous flexible sheet defines pores, the inner spacer passage being defined by one or more of the pores.

AG. A kit as set forth in statement AD wherein the sacrificial anode comprises metal mesh configured to be wrapped around the inner spacer.

AH. A kit as set forth in statement AD further comprising an outer spacer configured to be disposed on the sacrificial anode inside said gap.

AI. A kit as set forth in statement AD further comprising a power supply device configured to be electrically coupled to the carrier pipe and the sacrificial anode and to impress a current between the carrier pipe and the sacrificial anode through the conductive coupling material to convey electrons from the sacrificial anode to the carrier pipe to protect the carrier pipe against corrosion.

AK. A kit as set forth in statement AD wherein the conductive coupling material comprises a flowable material.

AL A kit as set forth in statement AK wherein the casing defines an injection port and the conductive coupling material is configured to be injected through the injection port into the gap.

Having described the invention in detail, it will be apparent that modifications and variations are possible without departing from the scope of the invention defined in the appended claims.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A corrosion-protected pipe assembly for being pulled into a bore, the pipe assembly comprising:
a carrier pipe having a first transition portion, a second transition portion, a length extending between the first transition portion and the second transition portion, and a wall extending along the length having an exterior surface and an interior surface defining a carrier lumen;
a casing receiving the carrier pipe having a first end portion adjacent the first transition portion of the carrier pipe, a second end portion adjacent the second transition portion of the carrier pipe, a length extending between the first end portion and the second end portion of the casing, and a wall extending along the length of the casing having an exterior surface and an interior surface extending around the exterior surface of the carrier pipe wall along the length of the casing to define a gap between the interior surface of the casing and the exterior surface of the carrier pipe along the length of the casing;
a flowable potting material substantially filling said gap; and
a pull head mounted on the corrosion-protected pipe assembly configured to transmit a pulling force to the corrosion protected pipe assembly for pulling the pipe assembly into the bore as a unit;
wherein the flowable potting material has at least one corrosion-resistant property selected from the group of corrosion-resistant properties consisting of moisture transmission inhibitor and volatile corrosion inhibitor;
wherein the casing comprises a plurality of separate casing tubes that are connected to one another to from the casing and each of the plurality of casing tubes form a respective segment of the length of the casing; and
wherein the gap and the flowable potting material substantially filling the gap extend continuously along the length of the casing.

2. A pipe assembly as set forth in claim 1 wherein the pull head is configured to transmit the pulling force from the carrier pipe to the casing.

3. A pipe assembly as set forth in claim 1 wherein the pull head is fused to the casing.

4. A pipe assembly as set forth in claim 1 wherein the pull head includes a lip facing in a direction opposite the pulling direction and the pipe assembly comprises a flange joined to the carrier pipe and opposing the lip.

5. A pipe assembly as set forth in claim 1 wherein the pipe assembly is bendable along the lengths of the carrier pipe and the casing for navigating non-straight segments of the bore when the pipe assembly is pulled into the bore by the pull head.

6. A pipe assembly as set forth in claim 1 wherein the carrier pipe comprises a metal and the casing comprises a polymeric material.

7. A pipe assembly as set forth in claim 6 wherein the polymeric material comprises polyethylene.

8. A pipe assembly as set forth in claim 1 wherein the flowable potting material comprises one of a wax and a gel.

9. A pipe assembly as set forth in claim 1 wherein each of the plurality of casing tubes has a first end portion and a second end portion and the casing further comprises at least one casing coupler having a first end portion connected to the second end portion of one of the plurality of casing tubes and a second end portion connected to the first end portion of another of the plurality of casing tubes.

10. A pipe assembly as set forth in claim 9 wherein the casing coupler comprises a port for injecting the flowable potting material into the gap.

11. A pipe assembly as set forth in claim 9 wherein the first end portion of the coupling member is fused to the second end portion of said one of the casing tubes at an end-to-end butt joint and the second end portion of the casing coupler is fused said another of the plurality of casing tubes at an end-to-end butt joint.

12. A pipe assembly as set forth in claim 1 further comprising an end plug sealing the gap along each of the first and second end portions of the casing.

13. A pipe assembly as set forth in claim 1 wherein the gap is substantially annular and the pipe assembly further comprises at least one spacer for maintaining the carrier pipe in spaced apart relationship with the casing.

14. A bundle of pipes for being pulled into a bore including the pipe assembly of claim 1.

15. A bundle of pipes as set forth in claim 14 further comprising at least one additional pipe assembly of claim 1.

16. A method of installing an underground carrier pipe, the method comprising:
positioning a plurality of polymer casing tubes over the carrier pipe and connecting them together to form a casing over the carrier pipe while the carrier pipe is above ground such that a continuous gap is defined between an interior surface of the casing and an exterior surface of the carrier pipe, the continuous gap extending continuously along each of the plurality of casing tubes;
substantially filling the continuous gap with a potting material while the carrier pipe is above ground to form a corrosion-protected pipe assembly; and
pulling the corrosion-protected pipe assembly into a bore;
wherein the step of filling the gap comprises injecting the potting material through a port extending radially through the casing.

17. A method as set forth in claim 16 wherein the step of positioning the casing over the carrier pipe comprises:
positioning at least one casing coupler over the carrier pipe between an adjacent pair of the casing tubes; and
fusing one end portion of each of said at least one casing coupler to one of the respective adjacent pair of the casing tubes and fusing an opposite end portion of each of said at least one casing coupling to the other one of the respective adjacent pair of casing tubes.

18. A method as set forth in claim 16 further comprising attaching a spacer to the exterior surface of the carrier pipe before positioning the casing over the carrier pipe.

19. A method as set forth in claim 16 further comprising, before substantially filling the gap with a potting material, forming a plug of curable material covering an end portion of the gap adjacent an end portion of the casing and curing the curable material to form an end seal that seals the gap at said end portion of the casing.

20. A method as set forth in claim 16 wherein the step of pulling the corrosion-protected pipe assembly into the bore comprises pulling a bundle including the corrosion protected pipe assembly and at least one other pipe into the bore.

21. A method as set forth in claim 16 wherein the step of pulling the corrosion-protected pipe assembly into the bore comprises bending the pipe assembly to pull the pipe assembly through a non-straight segment of the bore.

22. A method as set forth in claim 16 further comprising drilling the bore at a work site.

23. A method as set forth in claim 22 wherein substantially filling the continuous gap with the potting material comprises substantially filling the continuous gap with the potting material at the work site.

24. A corrosion-protected pipe assembly received in a bore, the pipe assembly comprising:
a metal carrier pipe having a first transition portion, a second transition portion, a length extending between the first transition portion and the second transition portion, and a wall extending along the length having an exterior surface and an interior surface defining a lumen;
a polymer casing having a first end portion adjacent the first transition portion of the carrier pipe, a second end portion adjacent the second transition portion of the carrier pipe, a length extending between the first end portion and the second end portion of the casing, and a wall extending along the length of the casing having an exterior surface and an interior surface extending around the exterior surface of the carrier pipe wall along the length of the casing to define a gap between the interior surface of the casing and the exterior surface of the carrier pipe along at least a segment of the length of the casing;
flowable potting material substantially filling said gap and having at least one corrosion-resistant property selected from the group of corrosion-resistant properties consisting of moisture transmission inhibitor and volatile corrosion inhibitor; and,
a pull head mounted on the corrosion-protected pipe assembly configured to transmit a pulling force to the corrosion protected pipe assembly for pulling the pipe assembly into the bore as a unit;
wherein the gap comprises a section extending radially from the exterior surface of the wall of the carrier pipe to the interior surface of the wall of the casing, the flowable potting material extending radially in the section of the gap continuously from the exterior surface of the wall of the carrier pipe to the interior surface of the wall of the casing and the section of the gap being free of material other than the flowable potting material.

25. A bundle of pipes received in a bore comprising a plurality of corrosion-protected pipe assemblies as set forth in claim 24.

* * * * *